(No Model.)
P. FARWELL.
LEVER FOR WAGON BRAKES.
No. 365,737. Patented June 28, 1887.
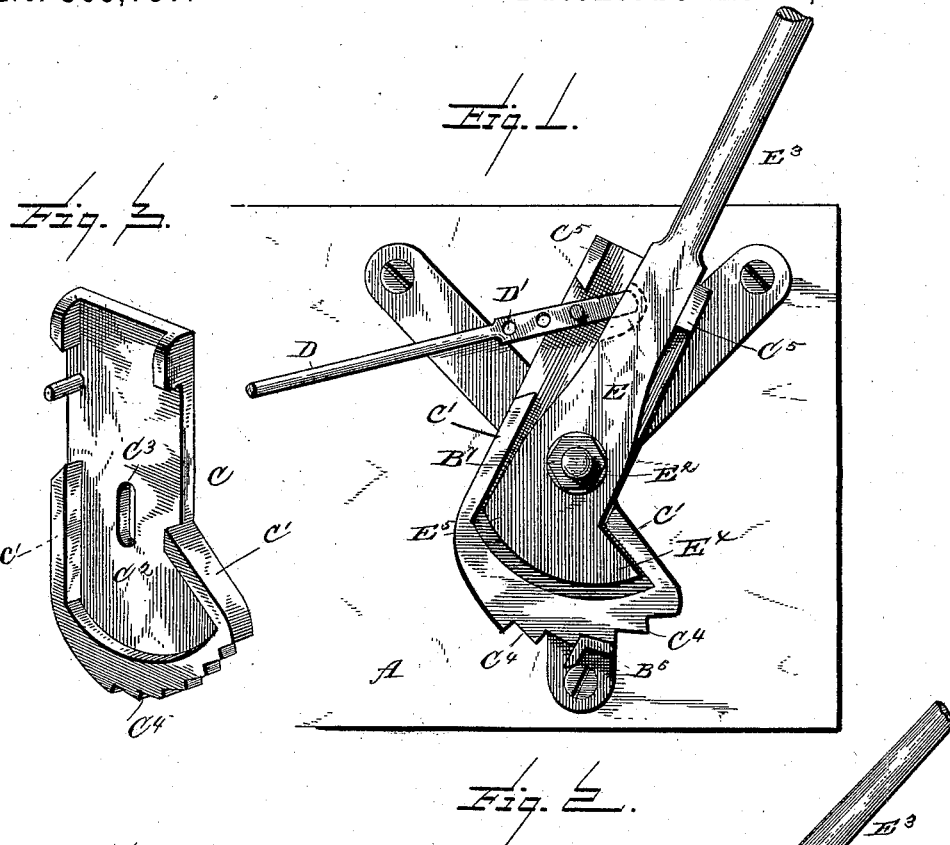
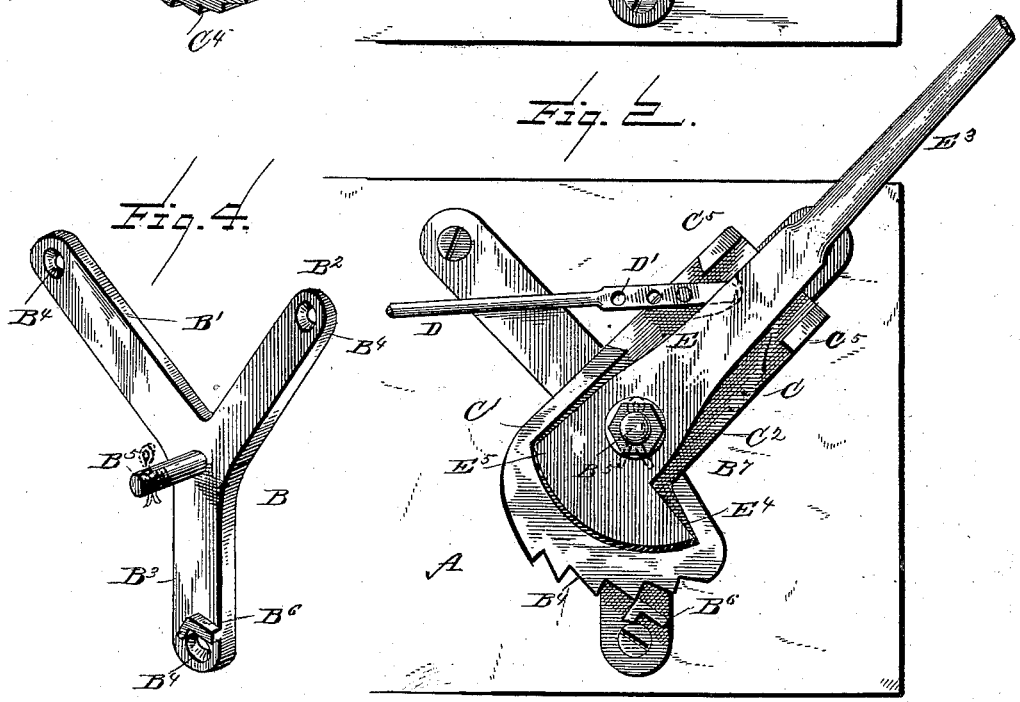
WITNESSES
L. C. Hill,
W. S. Duvall.
INVENTOR:
P. Farwell,
By E. B. Stocking, Attorney.

UNITED STATES PATENT OFFICE.

PULASKI FARWELL, OF FREDERICKSVILLE, ILLINOIS, ASSIGNOR OF ONE-THIRD TO JAMES B. JOHNSTON, OF ANTHONY, KANSAS.

LEVER FOR WAGON-BRAKES.

SPECIFICATION forming part of Letters Patent No. 365,737, dated June 28, 1887.

Application filed October 25, 1886. Serial No. 217,176. (No model.)

*To all whom it may concern:*

Be it known that I, PULASKI FARWELL, a citizen of the United States, residing at Fredericksville, in the county of Schuyler, State of Illinois, have invented certain new and useful Improvements in Brakes for Wagons and other Vehicles, of which the following is a specification, reference being had therein to the accompanying drawings.

My invention relates to brake-levers for wagons and other vehicles; and the object of the invention is to provide a brake-lever that is simple in construction, easy of operation, and that may be manipulated with one hand by a single lever.

The advantages and operation of my invention will appear in the following description, and the novel features thereof will be particularly pointed out in the claims.

Referring to the drawings, Figure 1 is a side elevation of a brake-lever constructed in accordance with my invention, the parts being shown in their relative position when holding a brake. Fig. 2 is a similar view, the parts being shown in the position they occupy when letting off the brake. Figs. 3 and 4 are details in perspective of the base and the ratchet-plate, hereinafter referred to.

Like letters of reference indicate like parts in all the figures of the drawings.

A represents a body of a wagon or other vehicle, to which is attached, by means of bolts or other securing devices, a Y-shaped base, B, which is formed with the three arms B' B² B³, each of which is perforated, as at B⁴, for the passage therethrough of the securing devices. At the intersection of the three arms B' B² B³ is an outwardly-extending lug, B⁵, the free end of which is screw-threaded or apertured for a split pin. This base is formed of metal, and, if desired, may be cast in a single piece. (See Fig. 4.)

C represents a plate, which is provided with marginal flanges C', forming a recess, C², and with an elongated slot, C³, whereby said plate is adapted to be mounted on the Y-shaped base, the lug B⁵ of which passes through said slot C³. The bottom flange of the plate C is provided with ratchet-teeth C⁴, (see Fig. 3,) and when in position upon the Y-shaped base said plate is capable of being thrown into and out of contact with a lug or fixed tooth, B⁶, preferably cast upon said base.

D represents a brake rod, which is pivotally connected and extends to an ordinary brake mechanism secured to the body or running-gear of the vehicle.

Mounted within the recess C² of the plate is a brake-lever, E, which is provided with an aperture, E², and a suitable operating-handle, E³, which extends up for convenient access to the driver or brakeman. The lug B⁵ passes through the aperture E², and is the pivot of the lever, which is retained thereon by the nut or pin B⁷. The bottom of the lever E conforms somewhat to the shape of the recess C², though of lesser dimensions, and is formed with a cam or foot, E⁴.

The rod D is provided with a series of holes, D', whereby it may be adjusted, thus allowing a greater or less pressure of the brake to take up wear, and adapting the mechanism for use upon wagons the bodies of which are of different lengths, the end thereof extending under the lever E, whereby it is retained in position upon the lug.

It is preferable, though not essential, that the Y-shaped base, the ratchet-plate, and the lever be cast in single pieces. Flanges or lugs C⁵ at the sides of the plate C serve as stops for the lever E.

This being the construction, the operation of my invention is as follows: Referring more particularly to Fig. 1, which is a view showing the parts in position when the brake is on, it will be seen that a backward pull upon the hand-lever E³ will swing the cam portion E⁴ thereof against the inner wall of the flange C', and that the ratchet-plate C will thereby be lifted, the slot riding the lug B⁵ until the teeth C⁴ thereof will pass out of contact with the dog B⁶, (see Fig. 2,) and in this manner pressure of the brake proper upon the wheels will be removed. To put on the brake it is only necessary to throw the hand-lever forward, when the heel E⁵ of said brake comes in contact with the opposite flange C' and causes the ratchet-teeth to be drawn backward over the dog B⁶, and when the lever is released said ratchet engages with the dog, whereby the plate and brake are held in a locked position automatically.

My lever and lock are adapted for use in and may be applied to not only the brakes on wagons and other vehicles, but also on plows, reapers and mowers, cable-railroad grips, link-motions to engines, and other mechanisms in which levers are employed, in a manner which renders a control or limitation of their movements desirable.

Having thus fully described my invention and its operation, what I claim is—

1. A brake for wagons and other vehicles, comprising a base having a lug and a fixed tooth, a ratchet-plate, and brake-lever mounted on said base and adapted to throw the ratchet-plate in and out of connection with the said tooth on the base, substantially as specified.

2. A brake for wagons and other vehicles, comprising a base having a fixed tooth, a ratchet-plate and brake-lever provided with an elongated slot mounted on the base, and having marginal flanges, and a brake-lever mounted on said base and provided with a cam or foot adapted to operate upon said flanges and cause the ratchet-plate to be thrown into and out of contact with the said tooth on the base, substantially as specified.

3. The combination of a Y-shaped base provided with a screw-threaded or apertured lug at the intersection of its arms, said arms being perforated for the reception of suitable retaining devices, with a plate flanged and provided with ratchet-teeth and a brake-lever mounted on said lug and adapted to throw the plate into and out of contact with a tooth on the base, substantially as specified.

4. The combination of the Y-shaped base B, having the apertured arms $B'$ $B^2$ $B^3$ and the lug $B^5$ and tooth $B^6$, with the plate C, formed with the marginal flange $C'$, ratchet $C^4$, and slot $C^3$, and with a cam-lever, as E, pivoted on the base and adapted to throw the plate into and out of connection with the tooth $B^6$, substantially as specified.

5. The combination of the Y-shaped base B, having the lug $B^5$, and the plate C, provided with the marginal flange $C'$ and ratchet-teeth $C^4$, mounted thereon, with the cam-lever E, provided with the cam portions $E^4$ $E^5$, adapted to come into contact and operate upon the front and rear flanges of the plate, respectively, whereby the ratchet-teeth of said plate are thrown into and out of connection with a tooth, $B^6$, on the lower end of the base B, substantially as specified.

In testimony whereof I affix my signature in presence of two witnesses.

PULASKI FARWELL.

Witnesses:
E. M. BRADLEY,
JOHN B. HINTON.